(12) United States Patent
Pak et al.

(10) Patent No.: US 7,080,408 B1
(45) Date of Patent: Jul. 18, 2006

(54) DELAYED-DELIVERY QUARANTINING OF NETWORK COMMUNICATIONS HAVING SUSPICIOUS CONTENTS

(75) Inventors: Michael C. Pak, Portland, OR (US); Victor Kouznetsov, Aloha, OR (US)

(73) Assignee: McAfee, Inc., Santa Clara, CA (US)

( * ) Notice: Subject to any disclaimer, the term of this patent is extended or adjusted under 35 U.S.C. 154(b) by 840 days.

(21) Appl. No.: 10/006,549

(22) Filed: Nov. 30, 2001

(51) Int. Cl.
G06F 21/20 (2006.01)
G06F 21/06 (2006.01)

(52) U.S. Cl. .......................................... 726/24; 726/23

(58) Field of Classification Search ................ 713/201
See application file for complete search history.

(56) References Cited

U.S. PATENT DOCUMENTS 5,440,723 A * 8/1995 Arnold et al. ................ 714/2
2001/0001156 A1 * 5/2001 Leppek ....................... 713/201

FOREIGN PATENT DOCUMENTS

| EP | 0893 769 A1 | * | 1/1999 |
| EP | 0893769 A1 | | 1/1999 |
| WO | 01/38999 A1 | | 5/2001 |

* cited by examiner

*Primary Examiner*—Gilberto Barrón, Jr.
*Assistant Examiner*—Venkat Perungavoor
(74) *Attorney, Agent, or Firm*—Zilka-Kotab, PC; Christopher J. Hamaty

(57) ABSTRACT

A system, method and computer program product are provided for network-based scanning for potentially malicious content. Incoming and/or outgoing network communications traveling over a network are monitored, preferably at a gateway. Potentially malicious content in the network communications is identified. The identified potentially malicious content of the network communications is quarantined to help prevent damage that could be caused if the content is indeed malicious. In one embodiment, a pattern for testing the potentially malicious content network communications for malicious code can be executed. The network communications are conditionally delivered over the network based on the testing. In other embodiments, the network communications are delivered over the network after a predetermined delay and/or upon receiving a user request to release the suspect content from quarantine.

28 Claims, 4 Drawing Sheets

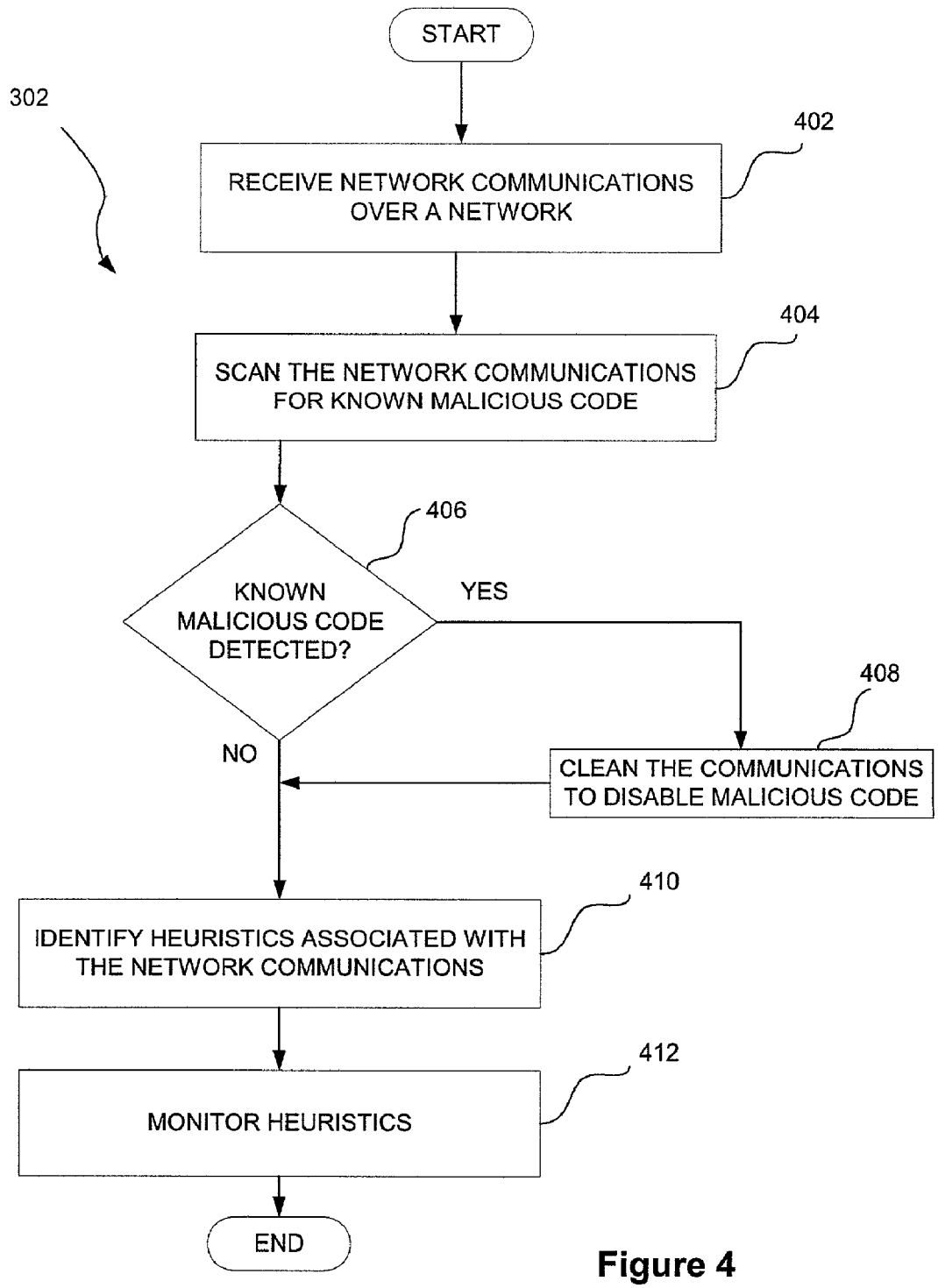

DELAYED-DELIVERY QUARANTINING OF NETWORK COMMUNICATIONS HAVING SUSPICIOUS CONTENTS

FIELD OF THE INVENTION

The present invention relates to data import and export management, and more particularly to automated user-customizable generation of service applications that manage data import and export operations.

BACKGROUND OF THE INVENTION

Network security management is becoming a more difficult problem as networks grow in size and become a more integral part of organizational operations. Attacks on networks are growing both due to the intellectual challenge such attacks represent for hackers and due to the increasing payoff for the serious attacker. Furthermore, the attacks are growing beyond the current capability of security management tools to identify and quickly respond to those attacks. As various attack methods are tried and ultimately repulsed, the attackers will attempt new approaches with more subtle attack features. Thus, maintaining network security is an on-going, ever changing, and increasingly complex problem.

Computer network attacks can take many forms and any one attack may include many security events of different types. Security events are anomalous network conditions each of which may cause an anti-security effect to a computer network. Security events include stealing confidential or private information; producing network damage through mechanisms such as viruses, worms, or Trojan horses; overwhelming the network's capability in order to cause denial of service; and so forth.

Of particular concern is the speed at which malicious code can spread throughout a single computer and even a network of computers. Many computers run anti-virus software that can be updated periodically. However, one problem is that only those viruses known prior to the last update are detected. Thus, a new virus may be undetectable. Further, in a network setting, such as a corporate intranet, only some of the computers may be running anti-virus software, while the others remain vulnerable to infection.

This problem is particularly prevalent with new strains of malicious code that infect email programs, replicate themselves, and send copies of the malicious code in email messages to recipients listed in the user's address book. Mass-mailer viruses/worms such as Nimbda and LoveBug send out a plurality of messages with the same attachments, and often with the same subject line. The infection spreads exponentially, as each subsequent recipient's address book is used to send the malicious code to new users, thereby propagating from system to system.

The prior art has attempted to remedy these problems by allowing users to send a file that they suspect is infected with malicious code to a scientist at a remote server via electronic mail. The scientist looks at the file and determines if it is infected. If so, the virus signature is identified and added to a DAT file, which is archived and stored. The user must then retrieve the updated DAT file from a general download site once it becomes available, install it, and perform a local virus scan. By then, hours and, more likely, days have passed, in which time the virus has spread.

What is needed is a way to detect and temporarily detain potentially infected data from a network data stream prior to the data reaching a client device.

SUMMARY OF THE INVENTION

A system, method and computer program product are provided for network-based scanning for potentially malicious content. Incoming and/or outgoing network communications traveling over a network are monitored, preferably at a gateway. Potentially malicious content in the network communications is identified.

Content can be identified as potentially malicious when a number of similar or identical instances of the content in the network communications passing through the network for a given period of time is greater than a predetermined value. For example, when the network communications include electronic mail messages, an electronic mail message can be identified as having potentially malicious content when a number of messages having an identical subject line and/or attachment passing through the network for a given period of time is greater than a predetermined value. This helps prevent the spread of malicious content such as mass-mailer viruses.

The identified potentially malicious content of the network communications is quarantined to help prevent damage that could be caused if the content is indeed malicious.

A pattern for testing the potentially malicious content network communications for malicious code can be executed. One example of a pattern is to hold the suspect data in quarantine until a new malicious code detection file, such as a DAT file, is available. Such malicious code detection files contain identifying features, or signatures, of malicious code, thus permitting identification of the malicious code. Preferably, the DAT would be created after the potentially malicious content is received. This ensures that the latest DAT file (i.e., the latest available version, or at least a more recent version than the one currently being used) is used to scan the suspect content. Another pattern includes sending the suspect content to a scientist for evaluation and awaiting a response before releasing the quarantined data. The network communications are conditionally delivered over the network based on the testing. For example, the network communication can be delivered on the condition that no portions of the communication matched the signatures of the DAT file, or that identified malicious code has been disabled/removed.

The network communications can also be delivered over the network after a predetermined delay and/or upon receiving a user request to release the suspect content from quarantine.

Preferably, the network communications are scanned for known malicious content such as viruses, worms, Trojans, etc. In this case, the potentially malicious content is cleaned if malicious code is found. The cleaning disables the malicious code such as by removing or recoding the malicious code.

As an option, the intended recipient of the potentially malicious content can be notified that potentially malicious content bound for him or her has been quarantined. Similarly, the sender of the potentially malicious content can be notified that data sent from the sender may have potentially malicious content, which has been quarantined.

BRIEF DESCRIPTION OF THE DRAWINGS

FIG. 4 illustrates the functionality of operation 302 of FIG. 3 in more detail.

DESCRIPTION OF THE PREFERRED EMBODIMENTS

Embodiments of the present invention identify electronic mail messages and other types of network communications that are suspected of being infected by malicious code, and quarantines such messages and communications having potentially malicious content. The identification of this potentially malicious content may be accomplished utilizing heuristics. Examples of such heuristics are provided below.

Figure 1:
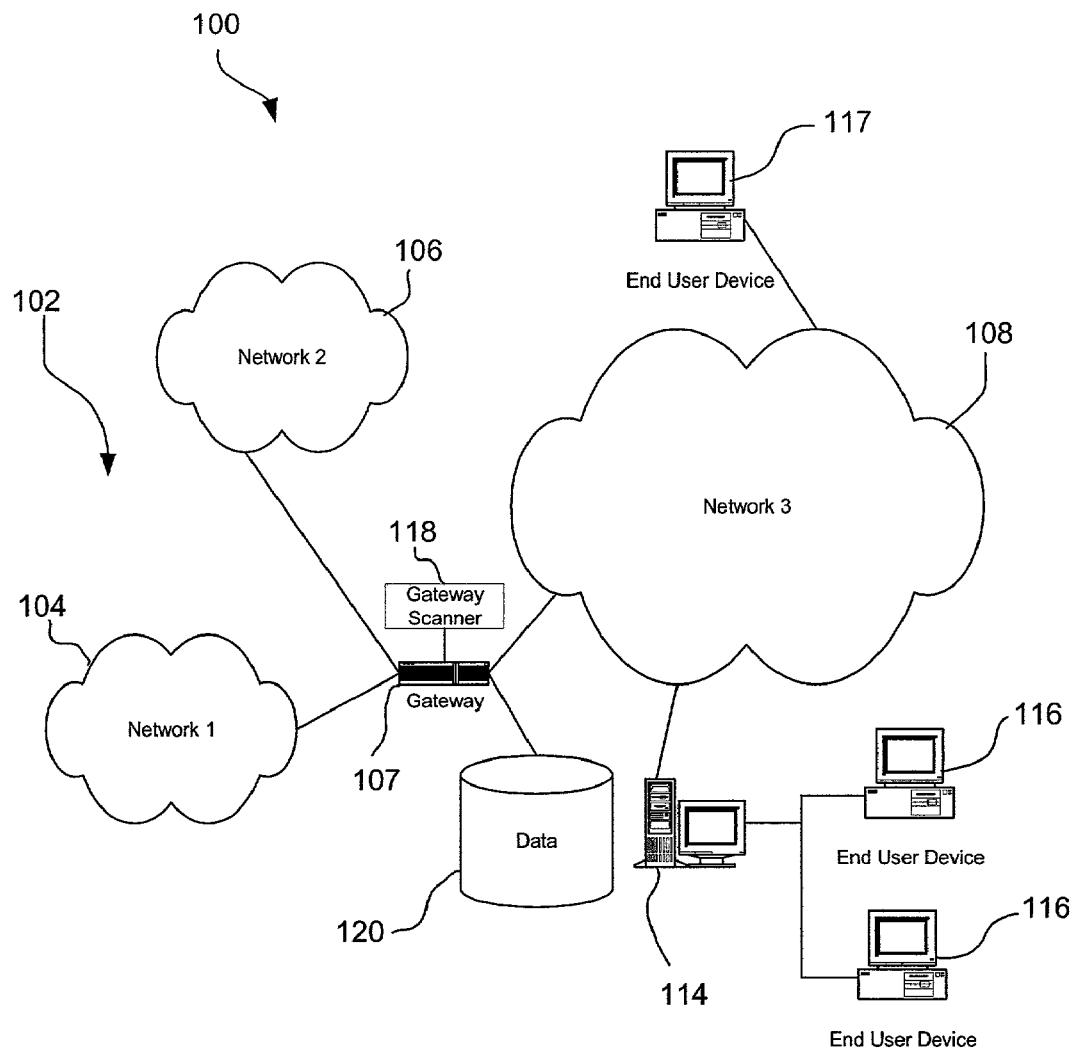
FIG. 1 is a representation of a system architecture according to one embodiment.

FIG. 1 illustrates a network architecture 100, in accordance with one embodiment. As shown, a plurality of remote networks 102 are provided including a first remote network 104 and a second remote network 106. Also included is at least one gateway 107 coupled between the remote networks 102 and a proximate network 108. In the context of the present network architecture 100, the networks 104, 106 may each take any form including, but not limited to a local area network (LAN), a wide area network (WAN) such as the Internet, etc.

In use, the gateway 107 serves as an entrance point from the remote networks 102 to the proximate network 108. As such, the gateway 107 may function as a router, which is capable of directing a given packet of data that arrives at the gateway 107, and a switch, which furnishes the actual path in and out of the gateway 107 for a given packet.

Further included is at least one data server 114 coupled to the proximate network 108, and which is accessible from the remote networks 102 via the gateway 107. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 117 may also be directly coupled to any of the networks, in one embodiment.

Further provided is a gateway scanner 118 coupled to the gateway 107. It should be noted that additional scanners may be utilized with any type of network element coupled to the networks 104, 106. In the context of the present description, a network element may refer to any component of a network. In use, the scanner is capable of executing a scanning procedure for detecting known malicious code and/or suspicious malicious content. Details regarding such scanning procedure will be set forth hereinafter in greater detail.

A data storage device 120 is coupled to the gateway 107. Suspicious data and/or data infected by malicious code and detected by the scanner 118 can be quarantined in a quarantine directory of the data storage device 120.

Figure 2:
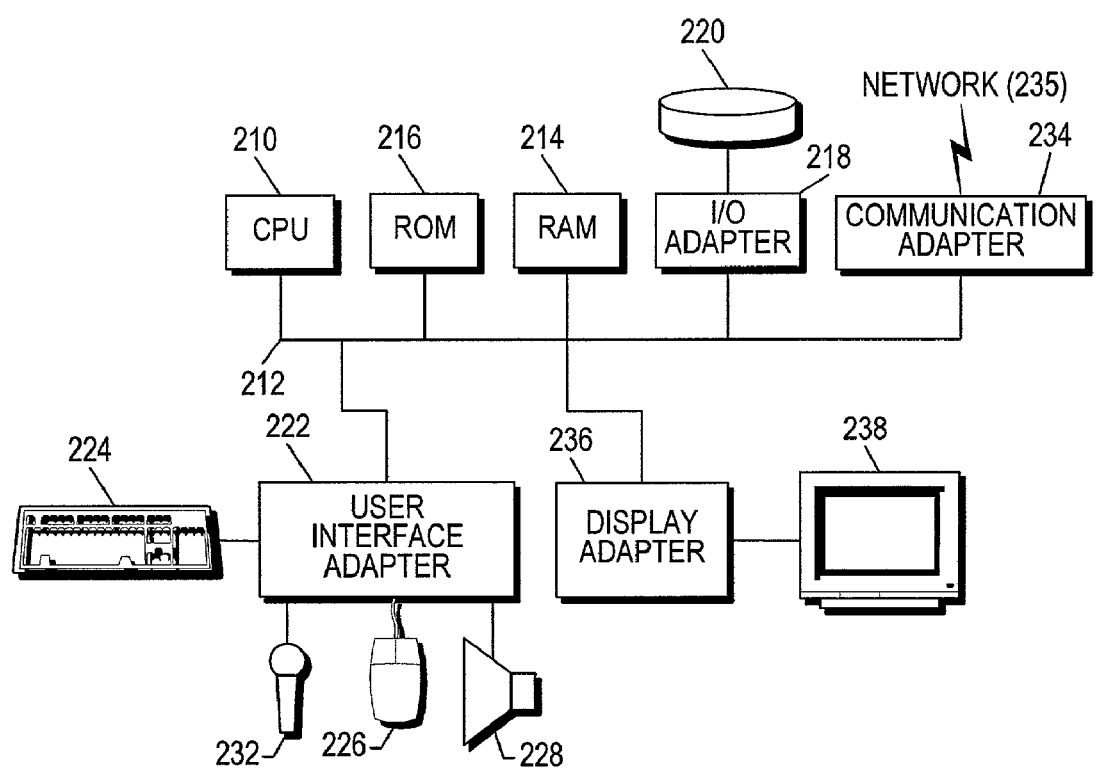
FIG. 2 shows a representative hardware environment that may be associated with the workstations of FIG. 1, in accordance with one embodiment.

FIG. 2 shows a representative hardware environment associated with a user device 116 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® NT or Windows® 2000 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Malicious code, or malware, can include any program that performs or attempts to perform any unauthorized act. For example, one type of malicious code is a virus. A virus is a software program that self-replicates recursively. Viruses may damage data, cause the computer to crash, display messages, or lie dormant. Another type of malicious code is a worm, which is a virus that usually replicates using computer networks, such as via email or Internet Relay Chat (IRC). Yet another type is a Trojan, a program that either pretends to have, or is described as having, a set of useful or desirable features, but actually contains a damaging payload.

Malicious code can also attempt to create a denial of service. A denial of service is a means of attack against a computer, server or network. The attack may be an intentional or an accidental by-product of instruction code which is either launched from a separate network or Internet connected system, or directly at the host. The attack may be designed to disable or shutdown the target of the attack.

Known malicious code is usually detected via the scanner 118. The malicious code may be identified by recognizing a signature, file name, and/or checksum of known malicious code, by recognizing that code is being sent from a source already identified as a known threat, or in any other manner.

Figure 3:
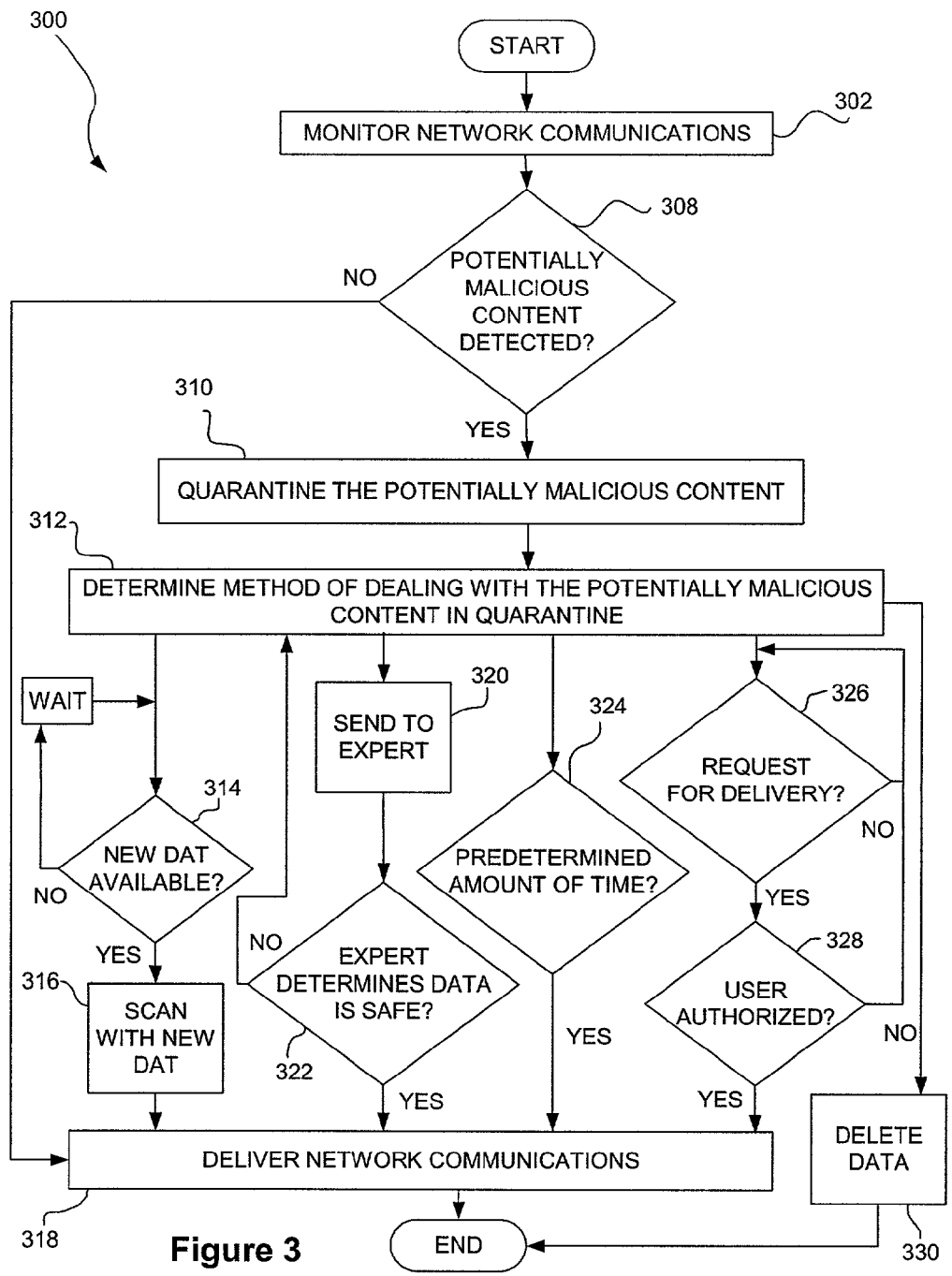
FIG. 3 is a flow diagram of a process for scanning for potentially malicious code in network communications.

FIG. 3 is a graphical representation of a process 300 for scanning for potentially malicious code in network communications. As shown, in operation 302 incoming and/or outgoing network communications traveling over a network are monitored for suspicious activity. The monitoring is preferably performed at a gateway, such as by a gateway scanner 118 as shown in FIG. 1. Note that the monitoring can be performed anywhere, such as at the data server 114 or the user devices 116. See FIG. 1. Further, multiple scanners can be positioned throughout the network.

FIG. 4 illustrates the functionality of operation 302 of FIG. 3 in more detail.

As shown, network communications are received in operation 402, and are scanned for known malicious code in operation 404. In operation 406, a determination is made as to whether known malicious code has been detected. If known malicious code is detected, the data is cleaned in operation 408. The cleaning disables the malicious code such as by removing or recoding the malicious code.

With continued reference to FIG. 4, if no known malicious code is detected, heuristics associated with the network communications are identified in operation 410 and monitored in operation 412.

Referring again to FIG. 3, at decision 308, a determination is made as to whether the data being monitored is suspected of having malicious content (code, attachment, etc.) based on the heuristics monitored in operation 412 (See FIG. 4.). If no potentially malicious content is detected, the content is delivered to the intended recipient in operation 318. In either case, monitoring of network communications continues.

The determination as to whether the network communications contains potentially malicious content is preferably based on heuristics. Any suitable type of heuristic can be used.

According to one heuristic, a histogram of content (attachments, subject line contents, etc.) is generated over a period of time. The histogram is analyzed to determine if multiple copies are being sent. Content can then be identified as potentially malicious when, for a given period of time, the number of similar or identical instances of the content in the network communications that pass through the network is greater than a predetermined value.

For example, when the network communications include electronic mail messages, an electronic mail message can be identified as having potentially malicious content when a number of messages having an identical subject line and/or attachment passing through the network for a given period of time is greater than a predetermined value. This helps prevent the spread of malicious content such as mass-mailer viruses and worms. As an example of use, suppose 100 copies of "Attachment A" have been received, scanned and delivered in the last 10 minutes. This may merely be SPAM, or it may be a mass mailing initiated by malicious code. Because the number of copies is above a prespecified threshold of 20 identical attachments per 10 minute period, further communications with these attachments are quarantined in a quarantine directory. A notice may also be sent to recipients of the attachment prior to the quarantining that the attachment is suspected of containing malicious content. Preferably, both incoming and outgoing communications with the suspect attachment are sent to the quarantine directory.

If potentially malicious content questionable attachments, etc.) in the network communications is identified based on heuristics (threshold reached, etc.), it is quarantined in operation 310 to contain the malicious content and prevent damage that could be caused if the content is indeed malicious. Note that the potentially malicious content and/or some or all of the particular network communication can be quarantined, depending on how the system is configured. As a further option, when multiple recipients are to each receive a copy of a potentially malicious content, one copy of the potentially malicious content can be placed in the quarantine with each of the intended recipients saved in a list. Later, once the content has been deemed safe, the single quarantined copy can be forwarded to each of the recipients. The benefit of this option is that memory/bandwidth is saved.

In operation 312 of FIG. 3, the method of dealing with the quarantined suspicious content is selected. Preferably, an authorized user can select which options to use when dealing with the potentially malicious content in quarantine. Among the options are:

Send suspect content to intended recipient

Separate the suspect portion of the content from the remainder of the original communication and put in quarantine; deliver non-suspect portion to intended recipient Hold suspect content in quarantine for a predetermined amount of time Hold suspect content in quarantine until a new DAT file is available Notify intended recipient that content is in quarantine Advise administrator to look at quarantine directory to determine next steps Delete the quarantined data Attempt to clean the quarantined data Note that the above list is not exhaustive, and any combination of options can be selected for dealing with the potentially malicious content.

As one of the options, a pattern for testing the potentially malicious content network communications for malicious code can be executed. One example of a pattern is represented in FIG. 3 by operations 314 and 316. As shown, in decision 314, the suspect data is held in quarantine until a new malicious code detection file, such as a DAT file, is available. Such malicious code detection files contain identifying features, or signatures, of malicious code, thus permitting identification of the malicious code. Preferably, the DAT used would be one created after the potentially malicious content was initially created and/or received. This ensures that the latest DAT file (i.e., the latest available version) is used to scan the suspect content. Note that a user can request a new DAT, wait for a weekly update or an EXTRA.DAT file which is used to detect newly discovered malicious code.

In operation 316, the quarantined data is scanned with the new DAT, and if no malicious code is found, is sent to the intended recipient in operation 318. If malicious code is found, the data is cleaned and the cleaned file sent to the user.

Another pattern includes operation 320, in which the suspect content is sent to an expert for evaluation before being releasing from quarantine. The expert can be akin to the scientist described above. For example, an administrator can send suspect content to AVERT or other anti-virus analysis group for a determination if previously unknown malicious code is present. AVERT (Anti-Virus Emergency Response Team) is a division of McAfee, and is an anti-virus research center where scientists research the latest threats, and uncover threats which may arise in the future. The administrator can also be the "expert". If the expert determines that the data is safe, the network communications are delivered to the recipient. Note decision 322. If the expert cannot verify the safety of the suspect content, operation 312 is re-executed.

When a pattern is used, the network communications are preferably conditionally delivered over the network based on the testing by the DAT file and/or expert. For example, the network communication can be delivered on the condition that no portions of the communication matched the signatures of the new DAT file, or that identified malicious code has been disabled/removed.

With continued reference to FIG. 3, one option allows delivery of the network communications over the network after a predetermined delay. In operation 324, the data is held in quarantine until the specified amount of time has passed. For example, the delay may be for 24 hours, "until 2 p.m. tomorrow," etc. This would provide time for an administrator to evaluate the threat, investigate the content, scan the quarantined data with a new DAT file, etc.

Another option allows delivery of the network communications over the network upon receiving a user request to release the suspect content from quarantine. Note operation 326. If the user is determined to be authorized at decision 328, the network communication is delivered in operation 318. If the administrator allows it, the recipient can request receipt of the data, even though it has not been deemed safe as of yet. Also, the administrator can release the data for delivery in operation 318.

As yet another option, the potentially malicious content can be deleted in operation 330. Preferably, non-suspicious portions of the network communications are salvaged and sent to the intended recipient along with a notice that the original communication included a portion suspected of containing malicious data, and that that portion has been deleted.

As a further option, the intended recipient of the potentially malicious content can be notified that potentially malicious content bound for him or her has been quarantined. The notification may be sent with or without content determined to be safe, such as a textual portion of an email message. Similarly, the sender of the potentially malicious content can be notified that data sent from the sender may have potentially malicious content, which has been quarantined.

While various embodiments have been described above, it should be understood that they have been presented by way of example only, and not limitation. For example, any of the network elements may employ any of the desired functionality set forth hereinabove. Further, any type of heuristic can be used in identifying suspicious content. Further, the list of techniques for releasing quarantined data should not be considered exhaustive. Thus, the breadth and scope of a preferred embodiment should not be limited by any of the above-described exemplary embodiments, but should be defined only in accordance with the following claims and their equivalents.

What is claimed is:

1. A method for network-based scanning for potentially malicious content, comprising:
   (a) monitoring network communications over a network;
   (b) identifying potentially malicious content in the network communications;
   (c) quarantining the potentially malicious content of the network communications;
   (d) executing a pattern for testing the potentially malicious content network communications for malicious code; and
   (e) conditionally delivering the network communications over the network based on the testing;
      wherein the potentially malicious content is quarantined until the potentially malicious content has been scanned with a malicious code detection file received after the potentially malicious content.

2. The method as recited in claim 1, further comprising scanning the network communications for known malicious content.

3. The method as recited in claim 1, wherein the malicious content includes a mass-mailer virus.

4. The method as recited in claim 1, wherein content is identified as potentially malicious when a number of instances of the content in the network communications is greater than a predetermined value.

5. The method as recited in claim 1, wherein the network communications include electronic mail messages.

6. The method as recited in claim 5, wherein an electronic mail message is identified as having potentially malicious content when a number of messages having an identical subject line is greater than a predetermined value.

7. The method as recited in claim 1, further comprising cleaning the potentially malicious content if malicious code is found, which is disabling of malicious code.

8. A computer program product embodied on a computer readable medium for network-based scanning for potentially malicious content, comprising:
   (a) computer code that monitors network communications over a network;
   (b) computer code that identifies potentially malicious content in the network communications;
   (c) computer code that quarantines the potentially malicious content of the network communications;
   (d) computer code that executes a pattern for testing the potentially malicious content network communications for malicious code; and
   (e) computer code that conditionally delivers the network communications over the network based on the testing;
      wherein the potentially malicious content is quarantined until the potentially malicious content has been scanned with a malicious code detection file received after the potentially malicious content.

9. A system for network-based scanning for potentially malicious content, comprising:
   (a) logic that monitors network communications over a network;
   (b) logic that identifies potentially malicious content in the network communications;
   (c) logic that quarantines the potentially malicious content of the network communications;
   (d) logic that executes a pattern for testing the potentially malicious content network communications for malicious code; and
   (e) logic that conditionally delivers the network communications over the network based on the testing;
      wherein the potentially malicious content is quarantined until the potentially malicious content has been scanned with a malicious code detection file received after the potentially malicious content.

10. A method for network-based scanning for potentially malicious content, comprising:
    (a) monitoring network communications over a network;
    (b) identifying potentially malicious content in the network communications;
    (c) quarantining the potentially malicious content of the network communications; and
    (d) delivering the network communications over the network after a predetermined delay;
       wherein the delay is for allowing quarantining of the potentially malicious content until the potentially malicious content has been scanned with a malicious code detection file received after the potentially malicious content.

11. The method as recited in claim 10, further comprising scanning the network communications for known malicious content.

12. The method as recited in claim 10, wherein content is identified as potentially malicious when a number of instances of the content in the network communications is greater than a predetermined value.

13. The method as recited in claim 10, wherein the network communications include electronic mail messages.

14. The method as recited in claim 13, wherein an electronic mail message is identified as having potentially malicious content when a number of messages having an identical subject line is greater than a predetermined value.

15. A method for network-based scanning for potentially malicious content, comprising:
    (a) monitoring network communications over a network;
    (b) identifying potentially malicious content in the network communications;
    (c) quarantining the potentially malicious content of the network communications in a quarantine; and (d) delivering the network communications from the quarantine over the network in response to a request from a user;
  wherein it is determined whether the user is authorized, and the network communications are delivered only if the user is determined to be authorized;
  wherein the potentially malicious content is quarantined until the potentially malicious content has been scanned with a malicious code detection file received after the potentially malicious content.

16. The method as recited in claim 15, wherein the user is an intended recipient of the quarantined network communications.

17. The method as recited in claim 15, wherein content is identified as potentially malicious when a number of instances of the content in the network communications is greater than a predetermined value.

18. The method as recited in claim 15, wherein the network communications include electronic mail messages.

19. The method as recited in claim 18, wherein an electronic mail message is identified as having potentially malicious content when a number of messages having an identical subject line is greater than a predetermined value.

20. A method for network-based scanning for potentially malicious content, comprising:
  (a) monitoring incoming and outgoing network communications over a network at a gateway;
  (b) scanning the network communications for known malicious content;
  (c) identifying potentially malicious content in the network communications;
  (d) wherein content is identified as potentially malicious when a number of identical instances of the content in the network communications passing through the network for a given period of time is greater than a predetermined value;
  (e) wherein the network communications include electronic mail messages, wherein an electronic mail message is identified as having potentially malicious content when a number of messages having an identical subject line passing through the network for a given period of time is greater than a predetermined value;
  (f) quarantining the potentially malicious content of the network communications;
  (g) delivering the network communications over the network upon occurrence of the first of:
    (i) scanning the potentially malicious content with a malicious code detection file received after the potentially malicious content is received;
    (ii) upon receiving a user request;
    (iii) upon passage of a predetermined amount of time;
  (h) notifying an intended recipient of the potentially malicious content that the potentially malicious content has been quarantined;
  (i) notifying a sender of the potentially malicious content that the potentially malicious content has been quarantined; and
  (j) cleaning the potentially malicious content if malicious code is found, which is disabling of malicious code.

21. The method as recited in claim 1, wherein the potentially malicious content is identified utilizing heuristics.

22. The method as recited in claim 21, wherein the heuristics include generating a histogram of content that has been sent over the network during a period of time and analyzing the histogram to determine whether a number of copies of the potentially malicious content that have been sent over the network during the period of time exceed a predetermined value.

23. The method as recited in claim 1, wherein the quarantining includes containing the potentially malicious content and preventing the potentially malicious content from creating damage.

24. The method as recited in claim 1, wherein when multiple recipients are to receive a copy of the potentially malicious content over the network, a single copy of the potentially malicious content is quarantined and each of the recipients is placed in a list such that after the potentially malicious content is determined to be clean based on the testing, the single copy is forwarded to each of the recipients.

25. The method as recited in claim 1, wherein an intended recipient of the network communications is notified that the potentially malicious content is quarantined.

26. The method as recited in claim 1, wherein the potentially malicious content is quarantined until the potentially malicious content has been scanned with the malicious code detection file received after the potentially malicious content and after the potentially malicious content is quarantined.

27. The method of claim 1, wherein the malicious code detection file is created after the potentially malicious content is identified such that a latest malicious code detection file is utilized in the scanning of the potentially malicious content.

28. The method of claim 1, wherein the malicious code detection file is created after the potentially malicious content is received such that a latest malicious code detection file is utilized in the scanning of the potentially malicious content.

* * * * *